United States Patent [19]

Doty

[11] Patent Number: 4,760,975
[45] Date of Patent: Aug. 2, 1988

[54] SEAT BELT RETRACTOR

[75] Inventor: Gerald A. Doty, Crown Point, Ind.

[73] Assignee: Gateway Industries, Inc., Olympia Fields, Ill.

[21] Appl. No.: 68,254

[22] Filed: Jun. 30, 1987

[51] Int. Cl.⁴ .............................................. B60R 22/40
[52] U.S. Cl. .............................................. 242/107.4 A
[58] Field of Search ................ 242/107.4 A; 280/806; 297/478, 480

[56] References Cited

U.S. PATENT DOCUMENTS

| Re. 29,095 | 1/1977 | Heath | 242/107.4 A X |
| 3,930,622 | 1/1976 | Tanaka et al. | 242/107. 4 A |
| 3,990,651 | 11/1976 | Romanzi et al. | 242/107. 4 A |
| 3,999,723 | 12/1976 | Magyar | 242/107.4 A |
| 4,166,592 | 9/1979 | Barcus et al. | 242/107.4 A |
| 4,343,444 | 8/1982 | Francis | 242/107.4 A |
| 4,560,115 | 12/1985 | Toyama et al. | 242/107.4 A |
| 4,603,819 | 8/1986 | Loose et al. | 242/107.4 A |

*Primary Examiner*—John M. Jillions
*Attorney, Agent, or Firm*—Fitch, Even, Tabin & Flannery

[57] ABSTRACT

A safety belt retraction apparatus is provided for use in a vehicle having at least one door and a chassis. The apparatus includes a safety belt retractor mechanism having a reel about which the webbing of the safety belt is wound. The reel is adapted to let out and take up the webbing. The safety belt retraction apparatus further includes a ratchet wheel associated with the take-up reel and a locking member mounted on a frame of the retractor mechanism for engagement with the ratchet wheel to stop protraction of the belt therefrom. An inertia member having a movable head is mounted on the frame, and the head is movable with inertia forces. The head is supported by a threaded adjustment member which is movable in discrete steps. The safety belt retractor mechanism also includes a transfer bar pivotally mounted on the frame and having a portion engageable with the head of the inertia member. The transfer bar has a free end which, when moved, contacts the locking member, urging it for movement into the ratchet wheel. The transfer bar is made of resilient material to store spring energy which increases the urging force in the event that the locking member is not free to travel its full extent into the ratchet wheel.

23 Claims, 3 Drawing Sheets

SEAT BELT RETRACTOR

BACKGROUND OF THE INVENTION

1. Field of the Invention

The present invention relates generally to improvements in seat belt retractors, and more particularly to seat belt retractors which are suitable for use in motor vehicles.

2. Brief Description of the Prior Art

One form of a seat belt retractor in use today employs a ratchet wheel on which the seat belt is wound. A metal lock bar is actuated by an inertia weight for insertion into the ratchet wheel upon sudden deceleration of the vehicle. The ratchet wheel, when engaged by the lock bar is prevented from rotation which would allow a pay-out of the seat belt, thereby securing the occupant of a vehicle in the event of a collision or other sudden vehicle deceleration. Teeth on the ratchet wheel engage the lock bar and hold the lock bar in its locking position because of the rake on the ratchet teeth.

A number of approaches have been taken to assure that as the locking member is advanced towards a locking position, it will reach that position even though it may hit the tip of a ratchet tooth and thereby not enter immediately between ratchet teeth where it will block further protraction of the seat belt. For example, U.S. Pat. No. 4,166,592 issued Sept. 4, 1979, provides an inertia weight carried on a spring arm, made either from a coiled spring or a plastic rod. This design has been effective in reducing the delayed blocking of the ratchet wheel during a time when the locking member would otherwise "bounce back," but for the resilient rod. U.S. Pat. No. 3,930,622 issued Jan. 6, 1976 also discloses a first embodiment having a resilient rod or stem made from a coil spring. In another embodiment, a conventional, nonresilient weight engages a leaf spring connected to a locking arm. Energy is stored in the leaf spring, which is attached to one end of the arm. Construction of these weights is somewhat complicated, requiring multiple steps for their assembly. It is desired to provide the same resilient biasing of the locking member without requiring an inertia weight assembled from a variety of materials and components.

In order to assure the timed movement of the locking bar into the space between adjacent ratchet wheel teeth, U.S. Pat. No. 4,603,819 provides a timing gear secured to one face of a main ratchet wheel, such as the ratchet wheels described above. In comparison to the main ratchet wheel, the timing gear has teeth that are longer and more pointed, having a smaller included angle at their tip. A pawl-like pick member activated by the weight is pivotally mounted on the retractor frame for inter-engagement with the teeth of the timing gear. The pick forms part of a body member which also includes a bar-engaging portion. Upon engagement of the pick with the timing gear, the bar engaging portion lifts the locking bar into engagement with the main ratchet wheel. Due to the shape of the timing gear teeth and their position and size relative to the teeth of the main ratchet wheel, they provide a timing function which ensures that the locking member does not engage the tip of the main ratchet wheel tooth, but rather is always directed between the teeth of that wheel. While generally satisfactory, more parts are required, and proper alignment during fabrication must now be provided not only for the main ratchet wheel and the locking member, but also for the pick and the timing gear. Any reduction in parts or labor needed to fabricate a retractor can have a tremendous effect on price and profitability, considering the economies of scale attendant in the automotive industry.

In constructing safety belt retractor mechanisms on a high-volume mass production basis, a number of steps are taken to assure that the retractor always functions properly despite any tolerance build-ups or variations in parts. For example, the relative spacing between the head of the weight and the locking member is often adjusted to assure the necessary travel of the locking member necessary to accomplish a locking engagement in the event of a sudden deceleration. Typically, the locking member is pivoted at one end and its opposing free end is swung into engagement with the ratchet wheel by the head of the weight which engages the locking member at a point intermediate its ends. Thus, an undesired spacing between the head of the weight and the portion of the locking member near its pivoted end could be amplified at the free end of the locking member. The effective locking operation of the retractor is closely monitored during assembly on a production line. Adjustments in the spacing of these pendulum-type inertia weights have been made by applying shim members to either the head of the weight or more often to the locking member to assure that the retractor will lock if it does not lock on its first test operation. A fairly large number of different sized shims is required, and the alignment procedure of selecting and applying a shim member slows the high volume mass production assembly of the retractor.

Other types of inertia weight arrangements, such as the "toppling-type" or "standing man-type" have had different adjusting arrangements. For example, U.S. Pat. No. 3,990,651 issued Nov. 9, 1976, discloses a plastic pin beneath a toppling weight. The plastic pin rides in a guide channel, and has a shaft protruding beyond the guide channel. When the proper position of the weight is achieved during the retractor fabrication process, the pin shaft is melted, welded or otherwise joined to its guide channel, which is also made of plastic, by heat and pressure applied to the pin shaft and/or the guide channel. The plastic pin must, of course, be very accurately positioned during this process, and external apparatus is required for the positioning, as well as the application of heat and pressure.

As another example, U.S. Pat. Re. 29,095 issued Jan. 4, 1977, discloses a cone-shaped disk balanced on the sharpened tip of an arbor-like threaded shaft. The threaded shaft is locked in a mounting plate with a lock nut. The arbor-type support is not readily adaptable for other weight designs having more elaborate configurations and, in particular, is not compatible with pendulum or swinging types of weights.

In yet another example of adjusting arrangements, U.S. Pat. No. 3,999,723 issued Dec. 28, 1976, shows a pendulum-type weight. As with other pendulum weights, the head is connected to a massive end portion through a stem. However, the weight is further provided with an axial extension of the stem, projecting upwardly beyond a head from which the weight is swingingly mounted. The tip of the axial extension is positioned within a conical seat located above the weight. The conical seat is formed at one end of a threaded screw which rides within the threaded bore of a moment arm, intermediate the two ends of that moment arm. One end of the moment arm provides pivotal mounting, and the other end engages a ratchet wheel to provide a locking action in response to swinging of the weight. This arrangement is not compatible with latch arms and the like that have camming engagement with the surface of the head, one example of which is found in U.S. Pat. No. 4,447,017, issued May 8, 1984. The arrangement disclosed therein includes first and second opposed, overlapping pivotally mounted arms, the first of which overlies and rides upon the second. The second arm, in turn, has a downwardly extending projection which rides on the head of a pendulum weight, with swinging of the pendulum weight displacing both arms, in sequence.

SUMMARY OF THE INVENTION

It is therefore an object of the present invention to provide a safety belt retractor mechanism having an improved manner of alignment between the head of the weight and the locking member, allowing a simple and rapid adjustment compatible with high-volume mass production assembly line techniques.

It is a related object of the present invention to provide an alignment mechanism of the above-described type which is comprised of a minimum number of inexpensive, easily fabricated and assembled components.

Yet another object of the present invention is to provide an improved arrangement for applying a bias force to a locking member for urging the locking member into engagement with a ratchet wheel.

These and other objects of the present invention, which will become apparent upon reference to the accompanying drawings and following detailed description, are provided by a retractor which includes a reel rotatably mounted on a frame, having at least one ratchet wheel thereon and carrying a rolled safety belt. A locking member is pivotally mounted on the frame for travel into engagement with the ratchet wheel to stop protraction of the belt from the reel. An inertia member is mounted on the frame and is movable with inertia forces to displace a portion of the inertia member in a first direction. Transfer means is also pivotally mounted on the frame for engagement with the locking member and with the portion of the inertia member. The transfer means includes a resilient leg movable in response to displacement of the portion of the inertia member to engage the locking member for urging the same into engagement with the ratchet.

BRIEF DESCRIPTION OF THE DRAWINGS

In the drawings, wherein like elements are referenced alike.

DETAILED DESCRIPTION OF THE PREFERRED EMBODIMENT

As shown in the drawings for purposes of illustration, the invention is embodied in a seat belt retractor, generally indicated by 10, including a horizontally-elongated, U-shaped frame 11 stamped from a heavy gauge metal and having side walls 12 and a connecting cross member 14. For securing the retractor 10 to its associated vehicle (not shown), the connecting cross member 14 of the frame 11 includes mounting lugs 15 and an aperture 16 in a raised portion 18 of the cross member 14 which may receive a threaded fastener.

The retractor 10 includes a cylindrical safety belt storage spool 19 mounted concentrically for rotation with a horizontal spool shaft 20 journaled within the side walls 12 of the frame 11. The end of a belt webbing (not shown) is secured to the spool shaft 20 interior of the spool 19, and spirally wound spring means (also not shown) typically associated with the shaft 20, bias the storage spool 19 and shaft 20 for rotation in a direction (clockwise for the illustrated retractor) to cause a retraction or winding of the webbing upon the spool 19.

Fastened to the spool 19 and shaft 20 are ratchet wheels 22 mounted on the ends of the spool 19 and shaft 20 interior of the side walls 12 of the frame 11. A locking member or pawl 24 is pivotally mounted at 23 between the side walls 12 of the frame 11 so as to be pivotally movable into a position in which the locking member 24 moves to engage the inclined teeth 25 of the ratchet wheels 22 to stop or arrest rotation of the spool 19 and shaft 20 in a direction (counterclockwise for the illustrated retractor) that permits protraction or unwinding of the safety belt webbing from the spool 19. Such a locking of the spool 19 by the locking member 24 is desired to occur only when the vehicle is under emergency conditions, such as a sudden stop or collision, when the passengers in the vehicle would be subjected to high deceleration forces, such locking preventing further protraction of the safety belt webbing to securely hold the passenger in place. However, under normal conditions, it is desirable that the spool be free to rotate in an unwinding direction against the force of the retraction spring to accommodate the relatively slow and deliberate movements that the passenger may make for reasons of, e.g., comfort.

Figure 3:
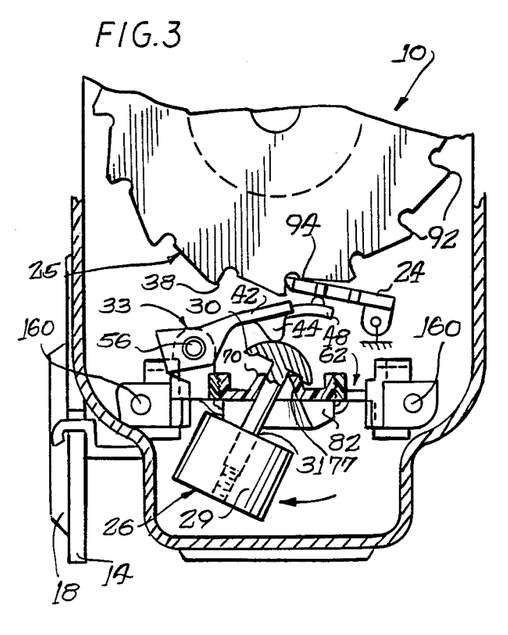
FIG. 3 shows the bottom portion of the safety belt retractor of FIG. 2, in a different operating position illustrating a locking of the ratchet wheel.

An inertia-sensing device is employed to pivot the locking member 24 into engagement with the ratchet teeth 25 only upon sensing a sudden change in vehicle velocity. In the illustrated mechanism, the inertia-sensing device includes a "pendulum" type inertia weight 26 which is supported by an adjustable cage or platform 28 which is supported by the side walls 12 of the retractor frame 11 in a manner to be described in greater detail, below. The pendulum weight 26 includes a relatively massive base portion 29 that is connected to a head or upper portion 30 through an intermediate stem 31. The weight 26 being thus configured has a low center of gravity and is consequently unstable and readily susceptible to swinging about its head 30 in response to undue forces exerted thereon by, e.g., the deceleration or acceleration of its associated vehicle. Upon swinging, the outer portions of head 30 are displaced vertically upwardly to actuate a transfer bar, generally designated by 33, which rides on the head and is pivotally mounted to the side walls 12 of the retractor frame 11 (See FIG. 3). With reference to FIG. 3, upon actuation, transfer bar 33 engages the locking member 24, causing the locking member to pivot so that its nose, or free end 36 is moved between the teeth 25 of ratchet wheel 22, so as to come in contact with a working face 38 of a ratchet tooth 25. Upon such engagement, ratchet wheel is prevented from counterclockwise movement, which produces unwinding or protraction of a safety belt of the illustrated retraction mechanism.

Figure 4:
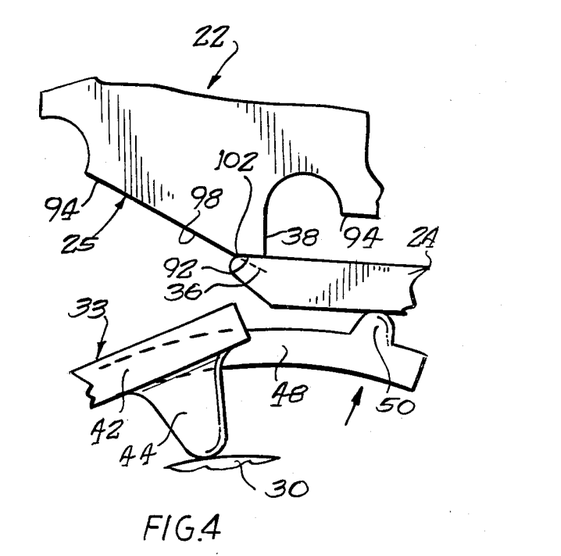
FIG. 4 is an enlarged fragmentary view of the ratchet wheel and retractor mechanism of FIG. 3 illustrating engagement of the locking member with a tip of a ratchet tooth.
Figures 5, 6, 7:
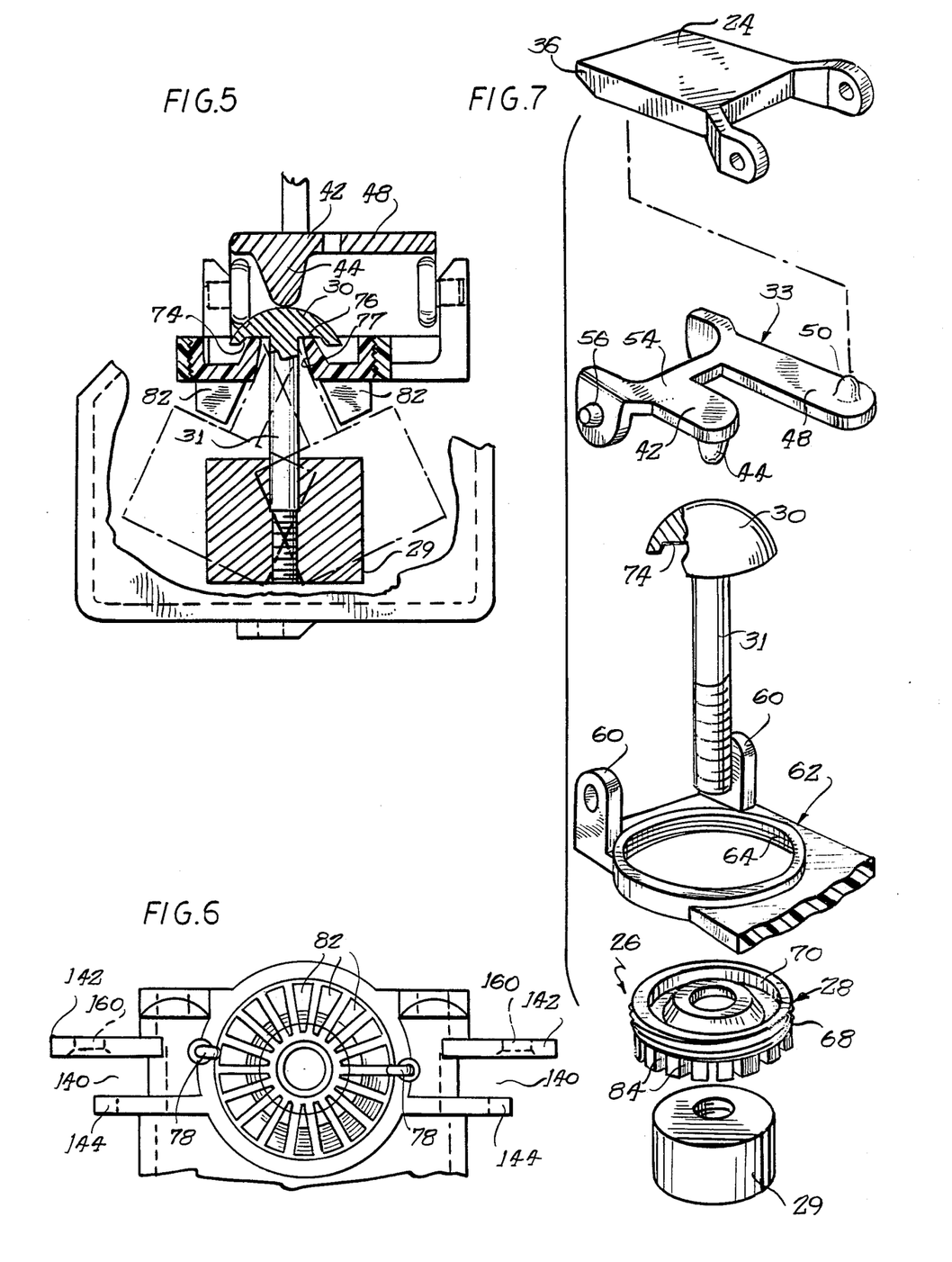
FIG. 5 is a cross-sectional view taken along the lines 5—5 of FIG. 2, looking in the direction of the arrows, with alternate positions of the pendulum weight shown in phantom lines.
FIG. 6 is a partial cross-sectional view taken along the lines 6—6 of FIG. 2 illustrating the adjustment mechanism of the present invention which is used to adjust alignment of the pendulum weight relative to the ratchet wheel.
FIG. 7 is an exploded perspective view of the retractor mechanism of the present invention.

As shown most clearly in the exploded view of FIG. 7, transfer bar 33 includes a first leg portion 42 having a downwardly-extending camming projection 44, which includes a rounded tip for engaging the rounded head 30 of pendulum weight 26. Transfer bar 33 further includes a second, longer and more resilient leg 48 having an upwardly-extending camming projection 50 which engages the underside surface of locking member 24. First and second legs 42, 48, are preferably arranged parallel and spaced from each other, being joined at one end to a common yoke portion 54 which includes stub shafts 56 for pivot mounting to th ears 60 of a mounting platform 62. As indicated in FIG. 4, the longer second leg 48 is made to deflect during certain operating situations which will be explained below.

In the preferred embodiment, transfer bar 33 is pivotally supported by the upstanding ears 60 of a mounting platform indicated generally at 62. Mounting platform 62 further includes a threaded aperture 64 which receives the threaded exterior 68 of adjustable cage 28. It can be seen that platform 62 provides adjustable support for cage 28. Adjustable cage 28 further includes a raised conical platform 70 for supporting the underside of the head 30 of weight 26. As shown most clearly in FIG. 5, raised conical platform 70 is terminated in a rounded support surface which is received in an undercut channel 74 formed in the underside surface of head 30. This provides a swinging mounting of the inertia weight. The maximum swing deflection of weight 26 is defined by an interior conical surface 77 of platform 70 which engages stem 31, as shown in FIG. 3.

Figure 1:
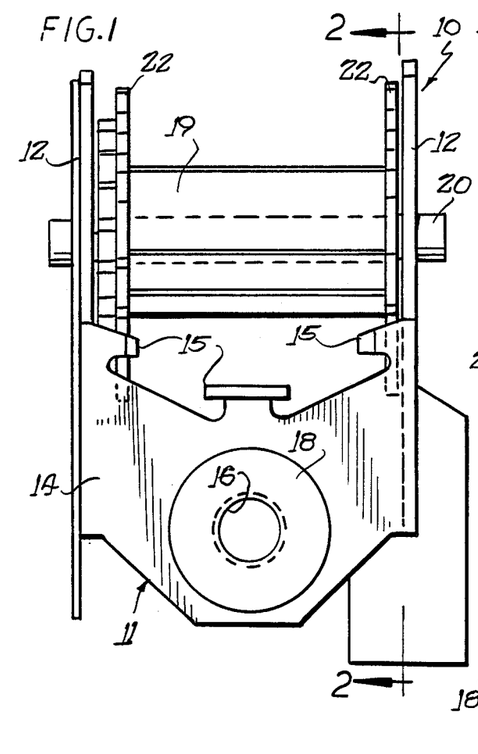
FIG. 1 is a side elevational view of a safety belt retractor embodying the present invention.
Figure 2:
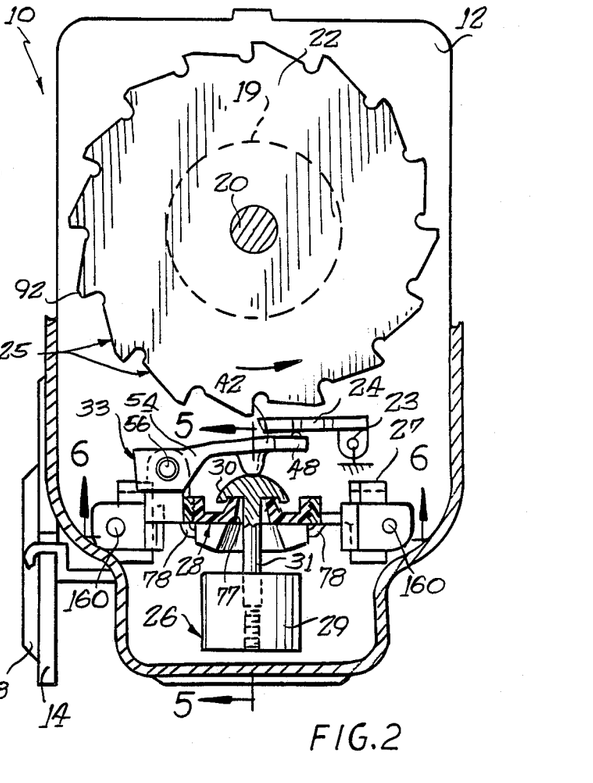
FIG. 2 is a cross-sectional view taken along the lines 2—2 of FIG. 1 looking in the direction of the arrows.

The smooth, rounded surface of the head 30 and the rounded tip of camming projection 44 allow first leg 42 to ride smoothly across the surface of head 30 as the outer edge of the head is raised, when weight 26 swings away from its normal, steady state position, indicated in FIG. 2. As the surface of head 30 is displaced toward ratchet wheel 22, it raises the free end of first leg 42, which is pivoted in an upward direction. When the adjustment means is properly aligned, the amount of displacement of the first leg 42, as shown in FIG. 3, creates a sufficient displacement in the free end of second leg 48 to push locking member 24 between the teeth of ratchet wheel 22.

Assume, for example, that cage 28 is initially at a position lower than that desired. In this lowered situation, although weight 26 is fully swung to one side, the tilting of its head 30 will not sufficiently deflect the first leg 42, and more importantly, the second leg 48, an amount necessary to deflect locking member 24 between ratchet teeth 25. Heretofore, shims were added to increase the thickness of head 30, ultimately causing the desired travel of locking member 24 indicated in FIG. 3. This proved to be cumbersome, and lengthy during fabrication on an assembly line. According to the illustrated embodiment of the present invention, adjustable cage 28 need only be rotated for threaded advancement in a direction toward ratchet wheel 22. Conversely, if cage 28 were initially adjusted at a position too close to ratchet wheel 22, the cage need only be rotated in an opposite direction for lowering the cage to a desired location properly spaced from ratchet wheel 22.

To lock adjustable cage 28 at a desired rotational position, despite vibration transmitted through the automobile chassis and frame 11, two detents or resilient locking fingers 78 are provided on the underside of mounting platform 62. As shown most clearly in FIG. 6, cage 28 has a plurality of outwardly extending fins 82 located at spaced radial positions about the underside of cage 28. Inter-fin spaces 84 receive resilient finger 78, as indicated at the righthand portion of FIG. 6, to lock cage 28 at any rotational position provided by the discrete stepping adjustment of the spaced fins 82 and resilient finger 78. As indicated in the lefthand portion of FIG. 6, the second finger 78 is not positioned to diametrically oppose the other resilient finger, but rather provides a "half-spacing" adjustment, thereby effectively increasing the number of adjustable positions at which cage 28 may be held during rotation within mounting platform 62.

It will be appreciated by those skilled in the art, that the adjustable cage 28 of the present invention, and its mounting platform 62 need not have a threaded inter-engagement to provide the desired adjustment of the pendulum weight head relative to the ratchet wheel. For example, aperture 64 of mounting platform 62 could have one or more radially inwardly extending resilient tabs or fingers for receiving circumferential grooves replacing the threaded exterior 68 of cage 28. The position of cage 28 could be adjusted by advancing the cage toward and away from ratchet wheel 22, causing the resilient tab or tabs to be transferred between adjacent grooves formed in the exterior surface of the cage 28. Other inter-engagement between cage 28 and the mounting platform 62 to provide the desired adjustable positioning between these two members is possible.

Referring now to FIGS. 2, 3, 4 and 7, a second feature of the illustrated embodiment of the present invention, that of providing a bias force when urging locking member 24 into engagement with ratchet wheel 22, will be described. As shown most clearly in the exploded perspective view of FIG. 7, transfer bar 33 transmits upwardly directed displacing forces (applied by the head of pendulum weight 26) through its shorter leg 42 and yoke portion 54 to its second, longer leg 48, causing an upward deflection in the free end of leg 48. Camming projection 50, located adjacent the free end of leg 48, contacts the underside of locking member 24 with a camming action which imparts an upward driving force.

It is possible, at a given instant of time when pendulum weight 26 is made to swing in a given direction, that the ratchet wheel 22 will not be aligned as shown in FIGS. 2 and 3, but may happen to lie at a small angular distance therefrom, so as to obstruct the full travel of locking member 24. The greatest impediment to the travel of locking member 24 occurs when ratchet wheel 22 is positioned such that the outermost surface or tip 92 of a ratchet tooth 25 engages the free end 36 of locking member 24, as illustrated in FIG. 4. At this point in time, further upward travel of locking member 24 is stopped, despite the swinging of pendulum weight 26. The illustrated embodiment of the present invention operates in this situation to store bias energy in the second, longer leg 48 which is sufficiently resilient to bend during this operating condition. The amount of bending corresponds to the remaining upward travel of locking member 24, were the locking member allowed the freedom of full, upward excursion to contact the radially inner stop surface 94 of ratchet wheel 22 (see FIG. 4).

The bending of the second, longer leg 48, stores bias energy which urges bar 24 against ratchet tooth 25. Bounce back is prevented, as the stored bias force provided by the present invention sets up locking member 24, ready to assume the locking position of FIG. 3, even if the ratchet wheel 22 is quickly accelerated in a counterclockwise direction as when the vehicle occupant presses against or otherwise tensions the safety belt in an emergency condition. The biasing force applied to the locking member by the stored energy of the second, longer leg 48 ensures that the free end of the locking member will enter between ratchet teeth, engaging the working surface 38 of the very next ratchet tooth to be presented to the locking member. Thus, the energy-storing feature of the illustrated embodiment ensures a quick response of the locking member necessary to obtain the locking engagement of FIG. 3 when a safety belt is suddenly jerked, displacing ratchet wheel 22 from the operating condition illustrated in FIG. 4.

As shown in the illustrated embodiment, a corner 102 is formed between the tip 92 and sloping surface 98. If desired, corner 102 can be rounded sufficiently to ensure a camming action between locking member 24 and ratchet tooth 25 under the action of the stored bias force in the second, longer leg 48. In this latter alternative, the bias energy stored in the second, longer leg 48 will tend to urge ratchet wheel 22 in a counterclockwise direction when the free end 36 of locking member 24 cams or slides along the sloping surface 98. This camming action would ultimately result in the paying out of a negligible amount of safety webbing from reel 22, but would allow ratchet wheel 22 and locking member 24 to assume the position shown in FIG. 3.

Figure 8:
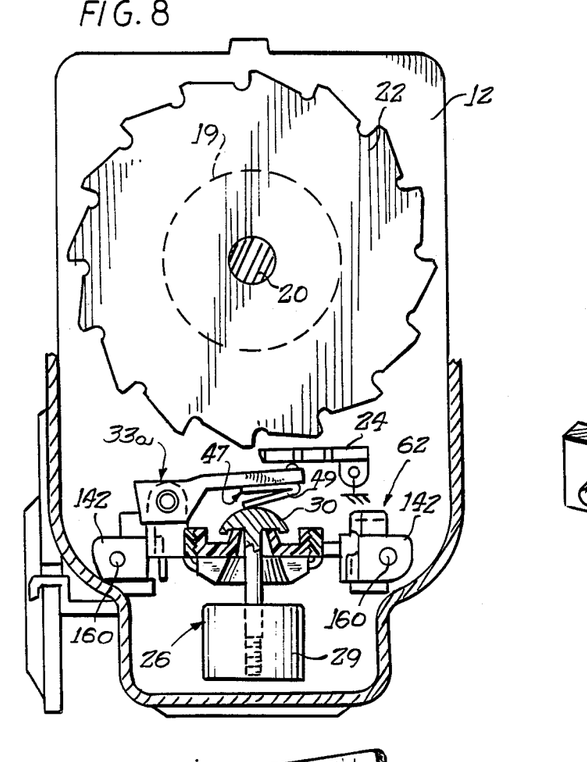
FIG. 8 is a cross-sectional view similar to FIG. 2, but having an alternative energy storage means.
Figure 9:
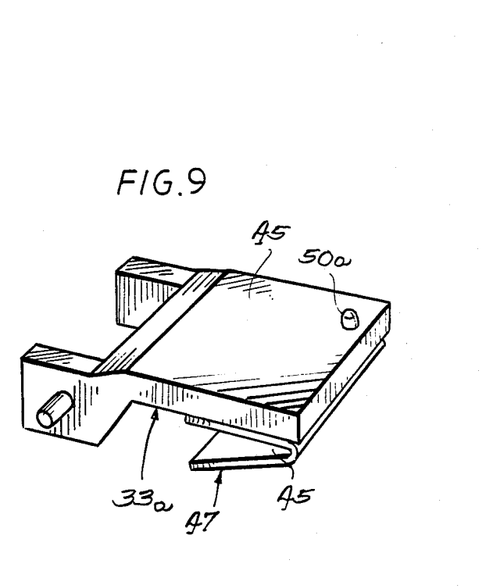
FIG. 9 shows the energy storage means of FIG. 8.

As shown in the illustrated embodiment, the resilient leg 48 of transfer bar 33 extends in a direction generally parallel to locking member 24. This arrangement ensures a compact arrangement as well as a continuous engagement between the resilient leg and the locking member during actuation of the retractor mechanism. However, resilient leg 48 need not be elongated and need not extend parallel to locking member 24, it being realized that other arrangements for providing a resilient member for contacting the locking member will occur to those skilled in the art upon studying the illustrated features of the present invention. For example, elongated bar 48 could be replaced by a force transfer means or the spring arm arrangement 170 of FIG. 9. Spring arm 170 is movable in response to displacements of head 30 to engage pawl 24, moving the pawl into engagement with ratchet wheel 22. At its pivotally-mounted end, spring arm 170 comprises a bushing-like body 172 for receiving a mounting shaft (not shown) in its central bore 174. The mounting shaft essentially replaces the stub shafts 56 of the previously-described embodiment and provides a pivot mounting of the spring arm to the ears 60 of mounting platform 62. The spring arm arrangement 170 further includes an outwardly projecting pin-like mounting arm 176 projecting outwardly in a direction normal to the axis of the bushing-like body 172. A helical spring 178 has a hollow central bore and a first end inserted over mounting pin 176 to form a close-fitting engagement therewith. The other end of spring 178 receives a rivet-like contacting member 180 having a pin-like body 182 and an enlarged head 184 with a camming edge surface 186. The pin-like body 182 of contact member 180 is received in the central bore of spring 178 and to form a tight-fitting engagement therewith. As indicated in FIG. 8, spring 178 is appreciably longer than the sum of the lengths of mounting arm 176 and pin-like body 182.

In the preferred embodiment, mounting arm 176 is relatively rigid compared to spring 178, and consequently the portion of spring 178 overlying mounting arm 176 is rendered relatively inflexible when inserted over the mounting arm. Similarly, the other end portion of spring 178 is rendered relatively inflexible by reason of the contact member body portion 182 inserted therein. As indicated in FIG. 8, an appreciable portion 190 of the length x lying between the opposed ends of mounting arm 176 and pin-like body portion 182, is free to flex when forces normally directed to the axis of spring 178 are applied thereto. In the preferred embodiment, that portion of spring 178 internally supported by a pin-like mounting arm 176 is in contact with the enlarged head 30 of pendulum weight 26 throughout its range of motion. As indicated in FIG. 8, the camming edge 186 projects beyond the outer surface of spring 178 and provides a point of contact with the underside of pawl 24.

The unsupported portion 190 of spring 178 provides a resilient flexture or bias force for urging locking member 24 into engagement with ratchet wheel 22 so as to prevent bounce-back, as discussed above. In this regard, the resilience of spring 178, and particularly the unsupported portion 190 thereof is designed to emulate the performance of leg 48 explained above with respect to the previous embodiment and, accordingly, all operational features are the same as those described with respect to the first embodiment.

Preferably, the bushing-like body 172 and mounting arm 176 are integrally molded from plastic or the like material, as is the contact member 180. These parts could, however, be formed of metal or other rigid material. Of course, it is also possible to form mounting arm 176 or the body portion 182 of a resilient material so as to contribute to the bias force exerted against pawl 24 in cooperation with that of spring 178.

As another alternative arrangement, enlarged head 30 of pendulum weight 26 could be positioned to engage the unsupported portion 190 of spring 178. In this alternative arrangement, it is desirable that the radius of curvature of head 30 be sufficiently small so that spring 178 is allowed to flex the amount required to provide sufficient bias force to pawl 24. However, it is preferred that head 30 throughout its range of travel, engage portions of spring 178 supported by arm 176. Among other things, this preferred arangement simplifies the design and fabrication of the spring arm, contact member, and helical spring.

Figure 10:
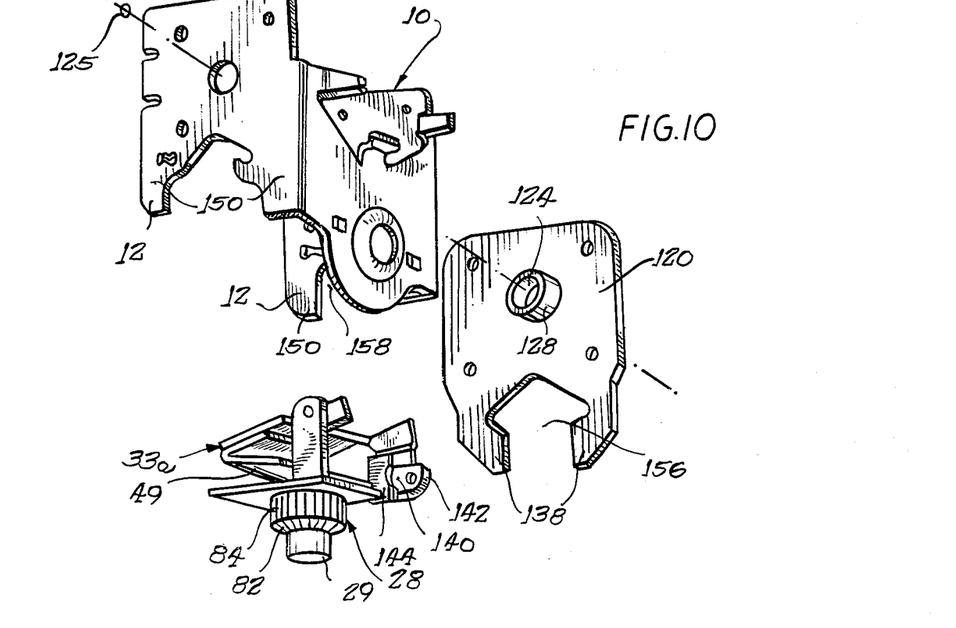
FIG. 10 is a partial exploded view of another safety belt retractor embodying the present invention.

Referring now to FIG. 10, another aspect of the present invention is illustrated in a retractor mechanism having a similar U-shaped frame 10. A wall-like, generally planar support 120 is dimensioned to overlie one of the walls 12, and provides support for the retractor mechanism in a manner similar to that described in U.S. Pat. No. 4,603,819 which is herein incorporated by reference. The support 120 is preferably formed by injection molding, and is conveniently provided with an aperture 124 for receiving the shaft 20, which also supports the reel. The axis of shaft 20 is indicated by broken line 125. A bushing 128 surrounding aperture 124 projects through an opening in side wall 12 to provide suitable support for one end of shaft 20. The mounting platform 62 is attached to the lower edge of support 120 by capturing walls 138 of support 120 in its recesses 140. As shown most clearly in FIG. 6, recesses 140 are formed between mounting ears 142,144. The wall portions 150 at the lower end of side wall 12 are also captured in recesses 140. Platform 62 is assembled to support 120 by seating recesses 160 onto mating projections (not shown) integrally molded on an exterior surface of support 120. Alternatively, platform 62 may be molded integrally with support 120. The central portions of platform 62 are received in cutout apertures 156, 158 of support 120 and side wall 12, respectively.

The transfer bar of this illustrated embodiment preferably has energy storing capability, such as that described above with reference to FIGS. 1–7, and a specific advantage of the illustrated embodiment is that it simplifies construction of the retractor of U.S. Pat. No. 4,603,819 in that the timing gear and pick of that retractor are no longer needed. However, if desired, the transfer bar need not be energy storing, it being expressly understood that the present invention also covers energy storage provided in an inertia weight having a resilient stem, as where stem 31 described above is made of plastic, rubber, a coil spring, or the like resilient construction.

The transfer bar and its mounting platform as described above is particularly advantageous when employed in a retractor such as that of U.S. Pat. No. 4,603,819 which has the inertia weight displaced laterally outwardly of the ratchet wheel. The transfer bar, in any of the forms described above, spans the distance of the lateral offset between the inertia weight and ratchet wheel members, to provide a simple inter-engagement between the two.

While these and other features of the present invention have been described in terms of an illustrated embodiment, there is no intention to limit the invention to the same. On the contrary, it is intended to cover all modifications and equivalents within the scope of the appended claims.

What is claimed is:

1. In a retractor including a reel rotatably mounted on a frame, having at least one ratchet wheel thereon and carrying a rolled safety belt, the combination comprising:
   a locking member pivotally mounted on the frame for travel into engagement with the ratchet wheel to stop protraction of the belt from the reel;
   first pivot means for pivotally mounting the locking member for turning about a first axis of rotation,
   an inertia member mounted on the frame and movable with inertia forces to displace a portion of the inertia member in a first direction; and
   a transfer lever pivotally mounted on the frame for engagement with the locking member and with the portion of said inertia member, second pivot means spaced from said first pivot means and mounting said transfer lever to pivot about a second axis of rotation spaced from said first axis of rotation, said transfer lever including a resilient leg movable in response to displacement of the portion of said inertia member to engage the locking member for urging the same into engagement with the ratchet wheel.

2. The retractor of claim 1 wherein said transfer level includes a second leg joined to said resilient leg and engageable with the portion of said inertia member to bring said resilient leg into urging engagement with said locking member.

3. The retractor of claim 2 wherein said inertia member includes a head, a massive end portion and an intermediate stem; and said retractor further comprises support means associated with said frame for receiving said stem and having a support surface engageable with the head to support said inertia member for swinging movement.

4. The retractor of claim 3 wherein said head comprises the displaceable portion of said inertia member which is engageable with said second leg portion.

5. The retractor of claim 3 wherein said support means further includes an inner surface engageable with said inertia member for limiting the swinging movement thereof.

6. In a retractor including a reel rotatably mounted on a frame, having at least one ratchet wheel thereon and carrying a rolled safety belt, the combination comprising:
   a locking member pivotally mounted on the frame for travel into engagement with the ratchet wheel to stop protraction of the belt from the reel;
   an inertia member mounted on the frame and movable with inertia forces to displace a portion of the inertia member in a first direction;
   transfer means pivotally mounted on the frame for engagement with the locking member and with the portion of said inertia member, said transfer means including a resilient leg movable in response to displacement of the portion of said inertia member to engage the locking member for urging the same into engagement with the ratchet,
   transfer means including a second leg joined to said resilient leg and engageable with the portion of said inertia member to bring said resilient leg into urging engagement with said locking member;
   said inertia member including a head, a massive end portion and an intermediate stem, said retractor further comprising support means associated with said frame for receiving said stem and having a support surface engageable with the head to support said inertia member for swinging movement;
   said head comprising the displaceable portion of said inertia member which is engageable with said second leg portion;
   said support means having a first movable portion threadably engageable with a second fixed portion, said support surface carried by said first portion for threaded advancement in opposing directions of adjustment.

7. The retractor of claim 6 further comprising detent means engageable with said first portion of said support means to restrain said first portion against movement that would disturb the threaded adjustment thereof.

8. The retractor of claim 7 wherein said first portion of said support means includes a plurality of spaced fins engageable with said detent means to provide a plurality of adjustment positions.

9. In a retractor including a reel rotatably mounted on a frame having at least one ratchet wheel thereon and carrying a rolled safety belt, the combination comprising:

an inertia member mounted on the frame and movable with inertia forces to displace a portion of the inertia member in a first direction;

a locking member pivotally mounted on the frame for travel into engagement with the ratchet wheel in response to displacement of the portion of the inertia member to stop protraction of the belt from the reel;

support means associated with the frame for supporting said inertia member, said support means adjustably movable with respect to said locking member to provide an adjustment in the responding travel of said locking member when the portion of the inertia member is displaced;

said support means having a first movable portion which includes a support surface which supports said inertia member and being threadably engageable with a second portion associated with said frame, said support surface being carried by said first portion for threaded advancement in opposing directions of adjustment, and a plurality of detent spaces arranged annularly about one of said first or second portions, and at least one locking detent projection integral with the other of first or second portions to be inserted into a detent space and to abut and to lock the first movable portion against turning.

10. The retractor of claim 9 further including transfer means pivotally mounted on the frame to engage the displaceable portion of the inertia member, said transfer means including a resilient leg movable in response to displacement of said portion of the inertia member to engage the locking member for urging the same into engagement with the ratchet.

11. The retractor of claim 10 wherein said transfer means includes a second leg attached to said resilient leg and engageable with said displaceable portion of the inertia member.

12. In a retractor including a reel rotatably mounted on a frame having at least one ratched wheel thereon and carrying a rolled safety belt, the combination comprising:

an inertia member mounted on the frame and movable with inertia forces to displace a portion of the inertia member in a first direction;

a locking member pivotally mounted on the frame for travel into engagement with the ratchet wheel in response to displacement of the portion of the inertia member to stop protraction of the belt from the reel; and support means associated with the frame for supporting said inertia member, said support means adjustably movable with respect to said locking member to provide an adjustment in the responding travel of said locking member when the portion of the inertia member is displaced;

said support means having a first movable portion threadably engageable with a second portion associated with said frame, said support surface being carried by said first portion for threaded advancement in opposing directions of adjustment; and said inertia member including a head, a massive end portion, and an intermediate stem, said first portion of said support means receiving said stem and including said support surface engageable with said head to support said inertia member for swinging movement.

13. The retractor of claim 12 wherein said head comprises the displaceable portion of said inertia member.

14. In a retractor including a reel rotatably mounted on a frame, having at least one ratchet wheel thereon and carrying a rolled safety belt, the combination comprising:

a locking member pivotally mounted on the frame for travel into engagement with the ratchet wheel to stop protraction of the belt from the reel;

an inertia member including a head, a massive end portion and an intermediate stem, said inertia member adjustably supported by the frame for movement with inertia forces to displace said head;

support means associated with said frame for receiving said stem, having a first movable portion threadably engageable with a second portion associated with said frame, said first portion including a support surface engageable with the head to provide adjustable support for said inertia member; and transfer means pivotally mounted on the frame for engagement with the locking member and with the head of said inertia member, said transfer means including a resilient leg movable in response to displacement of the head of said inertia member to urge the locking member into engagement with the ratchet wheel.

15. The retractor of claim 14 wherein said transfer means includes a second leg portion joined to said resilient leg and engageable with the head of said inertia member to bring said resilient leg into urging engagement with said locking member.

16. The retractor of claim 15 further comprising detent means engageable with said first portion of said support means to restrain said first portion against movement that would disturb the threaded adjustment thereof.

17. The retractor of claim 16 wherein said first portion of said support means includes a plurality of spaced fins engageable with said detent means to provide a plurality of adjustment positions.

18. In a retractor including a generally U-shaped frame having two side walls joined to an intermediate bight wall, and the retractor having at least one ratchet wheel rotatably mounted between the side walls and carrying a rolled safety belt, the combination comprising:

a locking member pivotally mounted on the frame for travel into engagement with the ratchet wheel to stop protraction of the belt from the ratchet wheel;

a wall-like support adapted to at least partially overlie one of the side walls and having means for securement thereto;

a mounting platform secured to and supported by said wall-like support, a pendulum inertia member mounted within one of said frame side walls and said wall-like support and projecting downwardly beneath said one of said side walls, and transfer means pivotally mounted on the mounting platform of the wall-like support for engagement with the locking member and with the portion of said inertia member, said transfer means including a leg movable in response only to displacement of said inertia member to engage the locking member for urging the same into engagement with the ratchet wheel.

19. The retractor of claim 18 further including means for storing a portion of the energy of said inertia member during movement thereof, and for applying said stored energy to said transfer means so as to bias said transfer means for movement towards said locking member so as to urge the same into engagement with the ratchet.

20. The retractor of claim 19 wherein at least a portion of said leg is comprised of resilient material so as to form said energy storage means.

21. The retractor of claim 19 wherein said energy storage means comprises spring means on said leg engageable with said displaceable portion of said inertia member.

22. In a retractor including a generally U-shaped frame having two side walls joined to an intermediate bight wall, and the retractor having at least one ratchet wheel rotatably mounted between the side walls and carrying a rolled safety belt, the combination comprising:

a locking member pivotally mounted on the frame for travel into engagement with the ratchet wheel to stop protraction of the belt from the ratchet wheel;

an inertia member mounted on the frame and movable with inertia forces to displace a portion of the inertia member in a first direction;

a wall-like support adapted to at least partially overlie one of the side walls and having means for securement thereto;

transfer means pivotally mounted on the wall-like support for engagement with the locking member and with the portion of said inertia member, said transfer means including a leg movable in response to displacement of the portion of said inertia member to engage the locking member for urging the same into engagement with the ratchet;

said inertia member including a head, a massive end portion and an intermediate stem, and said retractor further comprises weight supporting means carried by said wall-like support for receiving said stem and having a weight supporting surface engageable with the head to support said inertia member for swinging movement;

said head comprising the displaceable portion of said inertia member which is engageable with said transfer means; and said weight supporting means having a first movable portion threadably engageable with a second fixed portion, said weight supporting surface carried by said first portion for threaded advancement in opposing directions of adjustment.

23. The retractor of claim 22 further comprising detent means engageable with said first portion of said weight supporting means to restrain said first portion against movement that would disturb the threaded adjustment thereof.

* * * * *